(12) United States Patent
Fang

(10) Patent No.: US 10,101,825 B2
(45) Date of Patent: Oct. 16, 2018

(54) EARPHONE PLUG AND EARPHONE FUNCTIONNING AS TOUCH CONTROL DEVICE

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Yu Fang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/497,299

(22) Filed: Apr. 26, 2017

(65) Prior Publication Data

US 2017/0344138 A1 Nov. 30, 2017

(30) Foreign Application Priority Data

May 25, 2016 (CN) .......................... 2016 1 0356138

(51) Int. Cl.
*G06F 3/0354* (2013.01)
*H04R 1/10* (2006.01)

(52) U.S. Cl.
CPC ....... *G06F 3/03545* (2013.01); *H04R 1/1058* (2013.01); *H04R 1/1091* (2013.01); *H04R 1/1033* (2013.01); *H04R 2420/09* (2013.01)

(58) Field of Classification Search
CPC . G06F 3/03545; H04R 1/1091; H04R 1/1033; H04R 1/1058
See application file for complete search history.

(56) References Cited

U.S. PATENT DOCUMENTS

2013/0075149 A1* 3/2013 Golko .................. H01R 13/516
174/359

FOREIGN PATENT DOCUMENTS

KR 101232250 B1 * 2/2013

* cited by examiner

*Primary Examiner* — Sunita Joshi
(74) *Attorney, Agent, or Firm* — ScienBiziP, P.C.

(57) ABSTRACT

An earphone plug able to be utilized as a touch stylus comprises a column base, a conductive portion, a conductive tip, and a conductive core. A grip ring connects to the column base. The conductive core and conductive wires are received in the earphone plug. The conductive core connects to the conductive tip. The wires connect with the conductive core and the grip ring. When a user holds the conductive tip and makes the earphone plug contact a capacitive touch panel, a current from user's body in the position where the earphone plug makes contact changes the capacitive touch panel to record a touch.

10 Claims, 4 Drawing Sheets

EARPHONE PLUG AND EARPHONE FUNCTIONNING AS TOUCH CONTROL DEVICE

CROSS-REFERENCE TO RELATED APPLICATIONS

This application claims priority to Chinese Patent Application No. 201610356138.4 filed on May 25, 2016, the contents of which are incorporated by reference herein.

FIELD

The subject matter herein generally relates to the field of earphone, and particularly, to an earphone plug and an earphone functioning as a touch control device.

BACKGROUND

Touch screen is the most popular operating interface in today's technology industry. Various electronic products, such as a smart phone, a notebook computer, a tablet computer, a digital camera, and the like already have touch screens. The touch screen has gradually replaced the mechanical control mode of early electronic products. However, when a small touch screen of an electronic product is touched by user's finger, or the user's finger is dirty, sliding on the touch screen will not be smooth, and false positioning and false touches may occur, causing inconvenience for the user. To solve the above problem, a touch pen used on the touch screen is proposed to achieve a precise positioning effect. However, the touch pen increases the hardware cost of the electronic products.

In addition, with the improvement of people's living standards, demand for music is getting more and more attention and earphones are regarded as an essential part of an electronic device.

BRIEF DESCRIPTION OF THE DRAWINGS

Implementations of the present disclosure will now be described, by way of example only, with reference to the attached figures.

DETAILED DESCRIPTION

Figure 1:
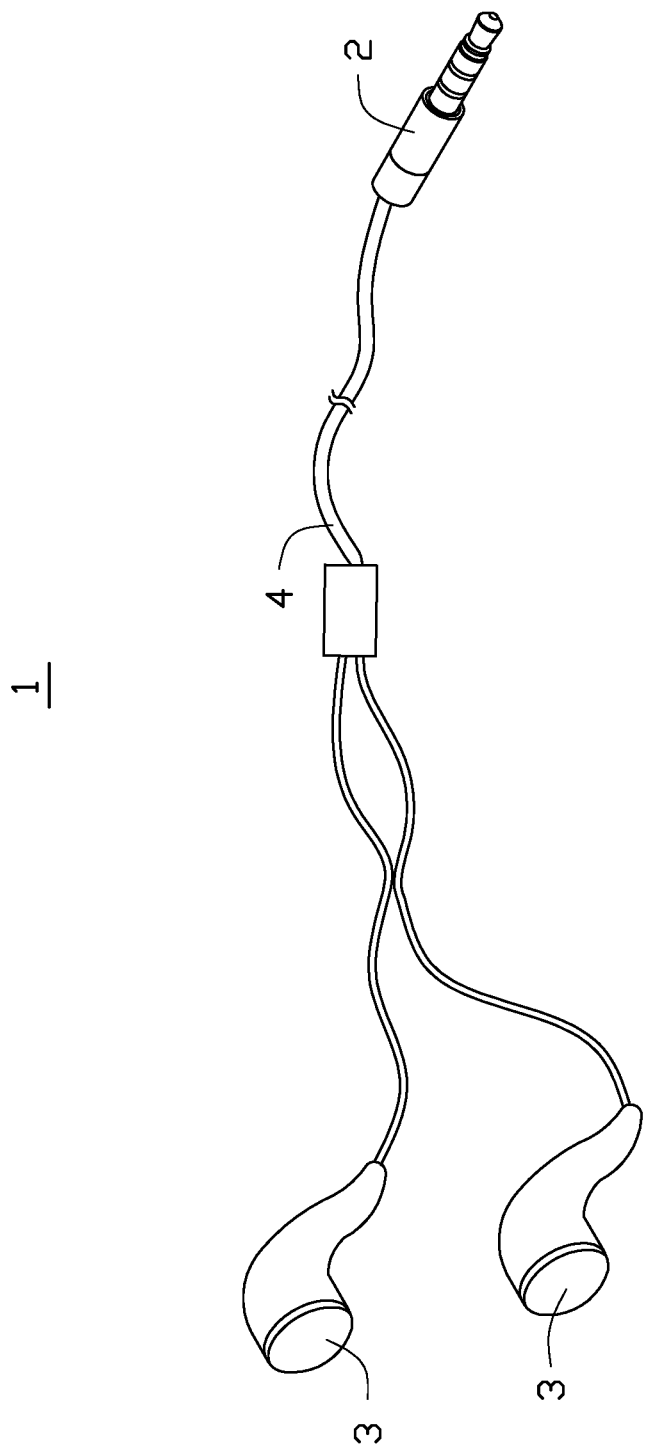
FIG. 1 is an isometric view showing an exemplary embodiment of an earphone.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the exemplary embodiments described herein.

The term "comprising" indicates "including", but not necessarily "limited to"; it specifically indicates open-ended inclusion or membership in a so-described combination, group, series, and the like.

Exemplary embodiments of the present disclosure will be described in relation to the accompanying drawings.

A summary or explanation of the disclosure would be as follows: a conventional stylus includes non-active stylus and active stylus. The non-active stylus has conductive properties. Conductive material is used to mimic user's finger to complete the operation of a man-machine interaction. In detail, the stylus is made of the conductive materials. A tip of the stylus is made of a conductive rubber. To avoid scratching a capacitive touch screen and ensure a conductive connection with a rod body of the stylus when sliding the stylus on the capacitive touch screen, a coupling capacitor is formed between the stylus and the capacitive touch screen. The formed coupling capacitor can make the high-frequency current of the capacitive touch screen flow to the touched position. The electronic device can detect the touched position according to the change in current, and execute a touch instruction corresponding to the touched position.

The active stylus transmits a wireless signal and a control signal by using the electrode. When turning on the power of the active stylus, the active stylus sends a driving signal. When a touch panel of the touch screen receives the driving signal, the touch screen determines the active stylus' position according to emission point of the driving signal. When a pressure sensing unit of the touch screen detects that an active stylus contacts the touch panel, the touch screen sends a control signal to indicate that the active stylus contacts the touch screen.

The touch panels include a resistance-type touch panel and a capacitive touch panel. When a finger or any object touches the resistance-type touch panel, the conducting layer of the resistance-type touch panel generates a voltage. The resistance-type touch panel determines the touched position according to the generated voltage. When a finger or any object touches the capacitive touch panel, a capacitive coupling between the capacitive touch panel and an electric field formed by the conductive layer of the capacitive touch panel is generated. The capacitive touch panel determines the contacted position according to the absorbed small current.

In at least one embodiment, the earphone with touch control function can be used as the non-active stylus. The earphone plug 2 has no need of a battery. When the earphone plug 2 contacts to the capacitive touch panel, the earphone plug 2 transmits the small current of the human body to the electric field formed by the conductive layer of the capacitive touch panel, which absorbs the small current. The capacitive touch panel determines the contacted position according to the absorbed current.

In an exemplary embodiment of the disclosure, FIG. 1 illustrates an earphone 1. The earphone 1 includes an earphone plug 2, a couple of earplugs 3, and an audio cable 4. The audio cable 4 is used to connect the earphone plug 2 with the earplugs 3.

Figure 2:
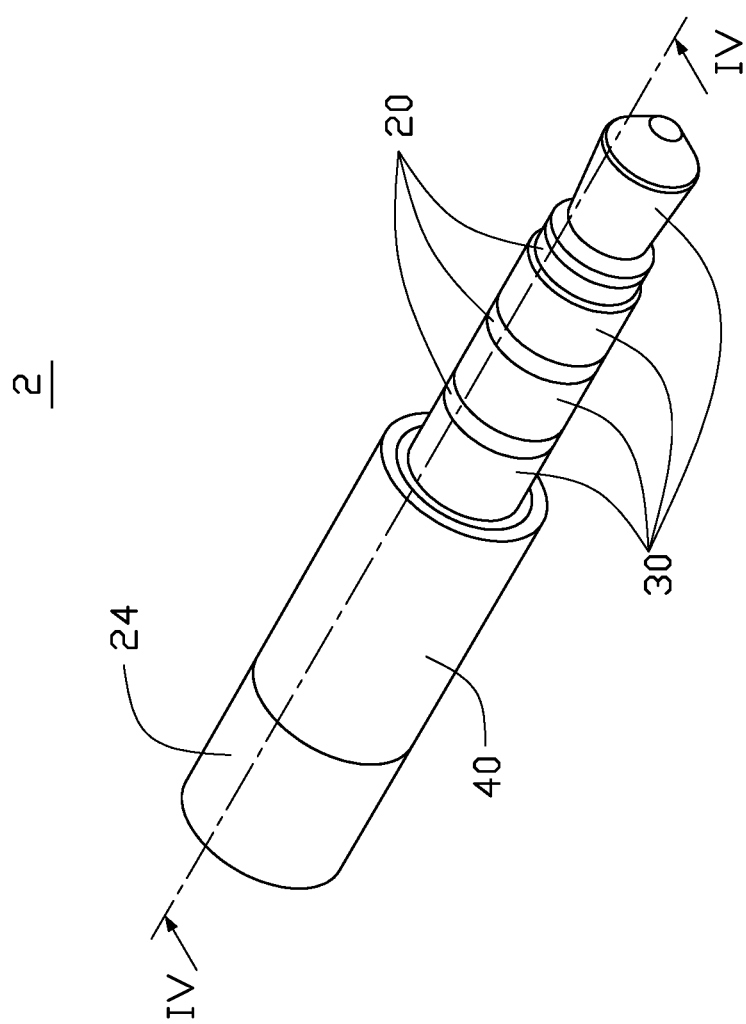
FIG. 2 is a view showing an earphone plug of the earphone of FIG. 1.
Figure 3:
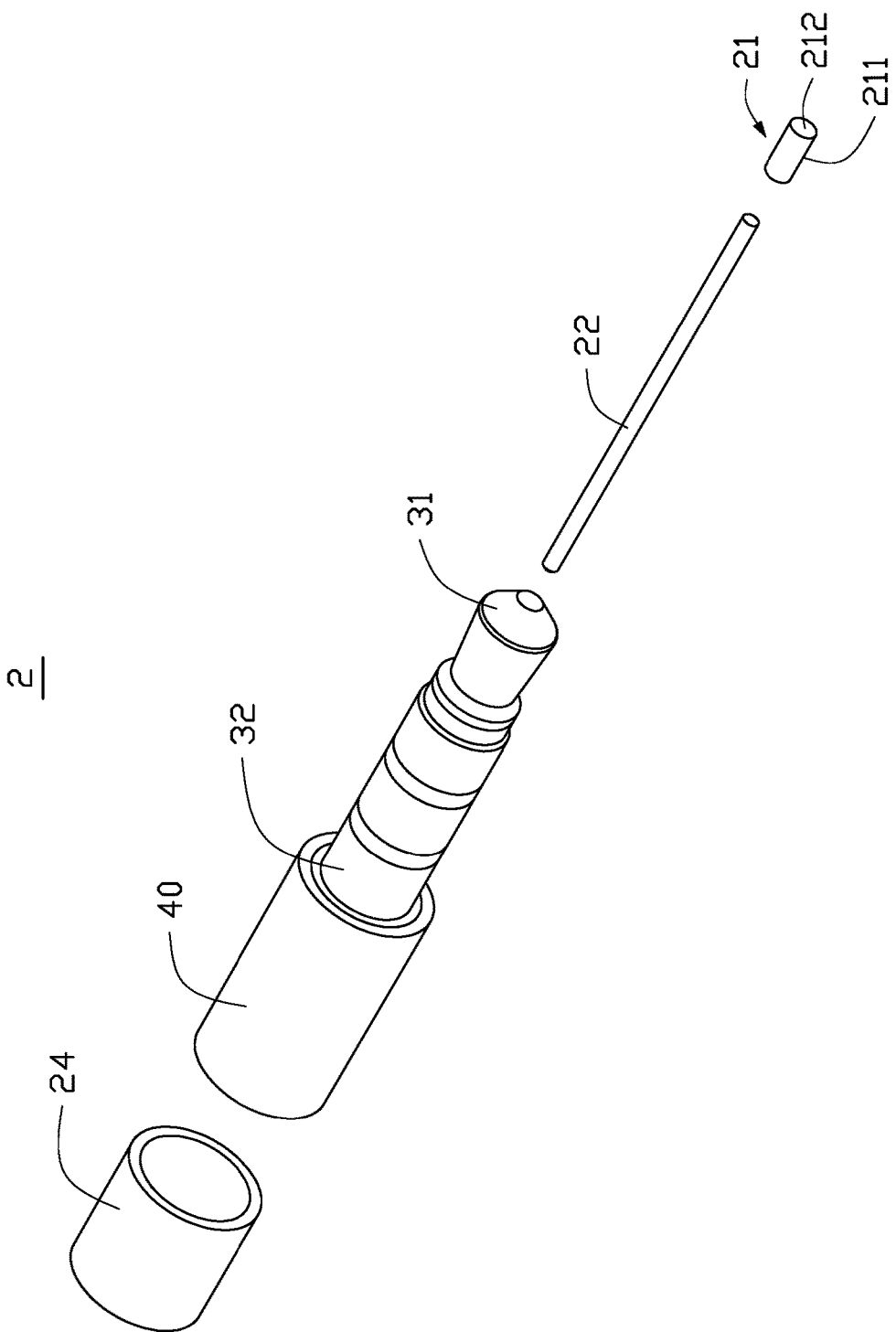
FIG. 3 is an exploded, isometric view of the earphone plug of FIG. 2.

FIG. 2 illustrates the earphone plug 2 of earphone 1, and FIG. 3 illustrates an exploded view of the earphone plug 2 of FIG. 2. The earphone plug 2 includes insulation rings 20, a conductive portion 30, and a column base 40. The column base 40 is sleeved on one end of the earphone plug 2 near the audio cable 4. In at least one embodiment, the column base 40 and the earphone plug 2 are fixed as a whole by injection molding. In at least one embodiment, the earphone plug 2 can be a four-segment headset plug. The conductive portion 30 includes a left-channel section, a right-channel section, a ground section, and a microphone section. The left-channel section, the right-channel section, the ground section, and the microphone section are separated by a number of the insulation rings 20. In another embodiment, the conductive portion 30 can be a three-segment headset plug. The three-segment headset plug includes a left-channel section, a right-channel section, and a ground section. The left-channel section, the right-channel section, and the ground section are separated by a number of the insulation rings 20.

In at least one embodiment, as shown in FIGS. 2 and 3, the conductive portion 30 includes a first end 31 and a second end 32 opposite to the first end 31. The first end 31 is away from the column base 40, and the second end 32 is close to the column base 40. The earphone plug 2 includes a conductive tip 21, a conductive core 22, wires 23 (shown in FIG. 4), and a grip ring 24.

Figure 4:
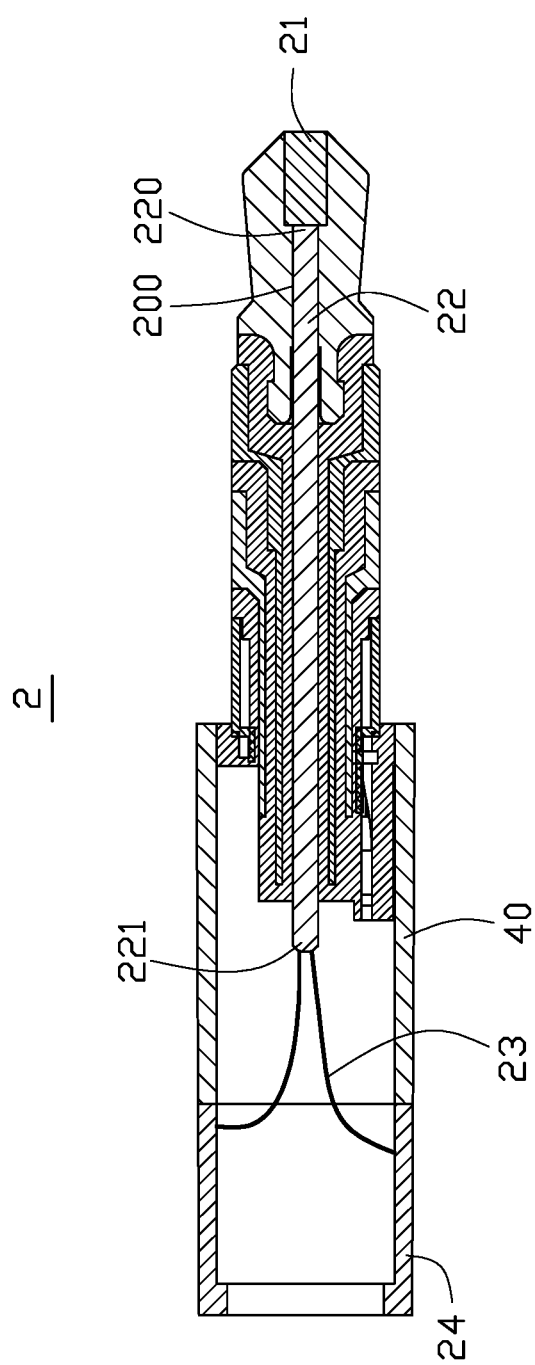
FIG. 4 is a cross-sectional view of the earphone plug of FIG. 2.

FIG. 4 illustrates the earphone plug of FIG. 2. The center of the earphone 2 defines a through hole 200. The conductive tip 21 and the conductive core 22 are received in the through hole 200. An inner side of the through hole 200 is coated with a layer of an insulating material. The insulating material prevents the conductive tip 21 and the conductive core 22 from contacting the conductive portion 30 of the earphone plug 2. In at least one embodiment, the insulating material can be insulating sleeve, insulating paper, or glass.

The conductive tip 21 connects to the first end 31 of the earphone plug 2. The grip ring 24 connects to the column base 40. It is convenient for a user to hold the earphone plug 2 by the grip ring 24. The conductive tip 21 is electrically connected with the conductive core 22. The conductive core 22 is electrically connected with the grip ring 24 by the wires 23.

In at least one embodiment, the conductive core 22 includes a first end 220 and a second end 221 opposite to the first end 220. The first end 220 of the conductive core 22 is connected with the conductive tip 21. The second end 221 of the conductive core 22 is connected with the wires 23. The wires 23 have two ends, one end of the wires 23 is electrically connected with the second end 221 of the conductive core 22, and the other end of the wires 23 is electrically connected with the grip ring 24.

In at least one embodiment, the grip ring 24 is made of a metal material or a conductive rubber. The grip ring 24 is used to transmit the small current of a human body to the touch panel (not shown) through the wires 23, the conductive core 22, and the conductive tip 21, thus making the earphone plug 2 act as the non-active panel.

In at least one embodiment, the conductive tip 21 can be a conductive soft sleeve. The conductive soft sleeve is arranged on the first end 31 of the earphone plug 2. The conductive soft sleeve is made of a conductive rubber, for example, a conductive silicon or a conductive sponge. The conductive soft sleeve can be used as a touch front end of a capacitive stylus.

In at least one embodiment, the conductive tip 21 further includes a circular sleeve head 211 and a projection 212 (referring to FIG. 3). The circular sleeve head 211 is arranged on the first end 31 of the earphone plug 2. The projection 212 connects to the circular sleeve head 211. The projection 212 is used to touch the capacitive touch panel. In one embodiment, the projection 212 defines a curved surface. When the conductive tip 21 contacts the capacitive touch panel, the curved surface of the projection forms a contact surface between the projection 212 and the conductive tip 21 which is conductive enough to guarantee a change in current of the capacitive touch panel, by which the capacitive touch panel determines the contact surface.

In at least one embodiment, when a user holds the conductive tip 21 and makes the earphone plug 2 contact the capacitive touch panel, the current in the position where the earphone plug 2 contacts the capacitive touch panel changes, and by absorbing the current the capacitive touch panel determines the contacted position.

The exemplary embodiments shown and described above are only examples. Even though numerous characteristics and advantages of the present disclosure have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. An earphone plug, comprising:
 a column base;
 a conductive portion comprising a first end and a second end opposite to the first end, the first end being away from the column base, the second end being close to the column base;
 a conductive tip configured to connect to the first end of the earphone plug;
 a conductive core received in the earphone plug, the conductive core comprising a third end and a fourth end opposite to the third end, the third end of the conductive core being connected with the conductive tip;
 a grip ring configured to connect to the column base;
 a wire received in the earphone plug, one end of the wire electrically connecting with the fourth end of the conductive core, and the other end of the wire electrically connecting with the grip ring, wherein when a user holds the conductive tip and makes the earphone plug contact a capacitive touch panel, a current in a position where the earphone plug contacts the capacitive touch panel changes, wherein the center of the earphone plug defines a through hole, the conductive tip and the conductive core are received in the through hole, an inner side of the through hole is coated with a layer of an insulating material, the insulating material prevents the conductive tip and the conductive core from contacting the conductive portion of the earphone plug.

2. The earphone plug according to claim 1, wherein the insulating material includes insulating sleeve, insulating paper, or glass.

3. The earphone plug according to claim 1, wherein the grip ring is made of a conductive rubber.

4. The earphone plug according to claim 1, wherein the conductive tip can be a conductive soft sleeve, the conductive soft sleeve is arranged on the first end of the earphone plug.

5. The earphone plug according to claim 4, wherein the conductive tip further comprises a circular sleeve head and a projection, the circular sleeve head is arranged on the first end of the earphone plug, the projection connects to the circular sleeve head, the projection is configured to touch the capacitive touch panel.

6. An earphone, comprising:
 an earplug;
 an audio cable;

an earphone plug connecting with the earplug through the audio cable, the earphone plug comprising:
a column base;
a conductive portion comprising a first end and a second end opposite to the first end, the first end being away from the column base, the second end being close to the column base;
a conductive tip configured to connect to the first end of the earphone plug;
a conductive core received in the earphone plug, the conductive core comprising a third end and a fourth end opposite to the third end, the third end of the conductive core being connected with the conductive tip;
a grip ring configured to connect to the column base;
a wires received in the earphone plug, one end of the wires electrically connecting with the fourth end of the conductive core, and the other end of the wires electrically connecting with the grip ring, wherein when a user holds the conductive tip and makes the earphone plug contact a capacitive touch panel, a current in a position where the earphone plug contacts the capacitive touch panel changes, wherein the center of the earphone defines a through hole, the conductive tip and the conductive core are received in the through hole, an inner side of the through hole is coated with a layer of an insulating material, the insulating material is configured to prevent the conductive tip and the conductive core from contacting with the conductive portion of the earphone plug.

7. The earphone according to claim 6, wherein the insulating material includes insulating sleeve, insulating paper, or glass.

8. The earphone according to claim 6, wherein the grip ring is made of a conductive rubber.

9. The earphone according to claim 6, wherein the conductive tip can be a conductive soft sleeve, the conductive soft sleeve is arranged on the first end of the earphone plug.

10. The earphone according to claim 9, wherein the conductive tip further comprises a circular sleeve head and a projection, the circular sleeve head is arranged on the first end of the earphone plug, the projection connects to the circular sleeve head, the projection is configured to touch the capacitive touch panel.

* * * * *